Nov. 26, 1963 E. KRANTZ 3,112,352
DISTRIBUTION CHANNEL FOR SUPPLYING WASHING LIQUID
Filed May 11, 1961

INVENTOR:
EVERT KRANTZ
BY Howson & Howson
ATTYS.

з,112,352
Patented Nov. 26, 1963

3,112,352
DISTRIBUTION CHANNEL FOR SUPPLYING WASHING LIQUID
Evert Krantz, Stockholm, Sweden, assignor to Aktiebolaget Svenska Fläktfabriken, Stockholm, Sweden
Filed May 11, 1961, Ser. No. 109,326
Claims priority, application Sweden, May 18, 1960
2 Claims. (Cl. 261—36)

The present invention relates to a distribution channel for supplying washing liquid to wet purifiers, or to the walls of similar gas-purification apparatus which are exposed to dust or other impurities in the gas.

In apparatus of this type, the washing liquid is usually recirculated for reasons of economy, and in spite of the use of sedimentation basins, filters and the like, the recirculated washing liquid becomes more or less laden with the impurities carried in the gas. The washing liquid is supplied to the apparatus by means of channels extending along the walls of the apparatus, and because of the low velocity of flow of washing liquid in the channels, there is a sedimentation of the impurities in the washing liquid, and the resulting deposits accumulate in a very short time to an extent that the distribution of the washing liquid by the channels is jeopardized resulting in non-uniform washing of the walls of the apparatus and improper washing in certain areas, or a reduction in the total flow of washing liquid which may also result in inadequate washing.

A primary object of the present invention is to eliminate the effect of impurities in the washing liquid as it flows in the distribution channels in a simple but effective way.

More particularly, the present invention provides a washing channel having a generally V-shaped cross section and in which the liquid is supplied at a number of points along the length of the channel at the bottom of the V-shaped cross section. Means is provided to cause the supplied liquid to flow longitudinally of the channel at high speed in order to eliminate the deposits which might otherwise occur due to sedimentation of the impurities carried by the liquid.

All of the objects of the invention are more fully set forth hereinafter with reference to the accompanying drawing illustrating preferred embodiments of the invention, and wherein.

Figure 1:
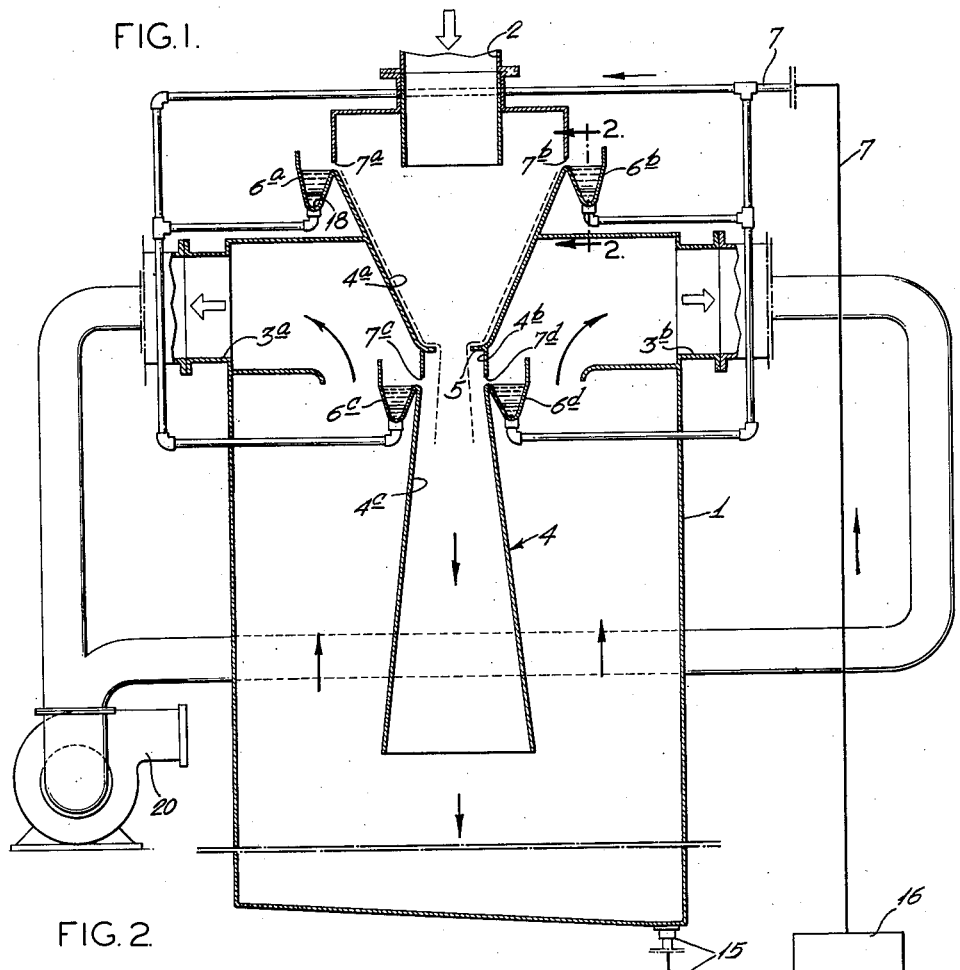
FIG. 1 is a cross section through gas-purification apparatus of the wet-cleaning type provided with distribution channels for supplying washing liquid in accordance with the present invention.

In the drawing, the invention is shown applied to a gas purification apparatus of the wet-cleaning type comprising a separation chamber 1 having a gas inlet 2 for the impurity-laden gas and gas outlets 3a and 3b for the cleansed gas. The gas is forced through the apparatus by suitable blower means, preferably an exhaust fan 20 connected to the gas outlets 3a and 3b.

The inlet opening 2 of the purifier admits the impurity-laden gas to the separation chamber 1 by means of an inlet channel 4 extending downwardly and terminating below the outlets 3a and 3b. The inlet channel 4 is venturi-shaped having a converging upper part 4a, a constricted throat 4b, and a diverging diffusor 4c. A continuous film of water is formed on the walls of the upper section 4a and flows downwardly toward the throat 4b. A throttle flange 5 is provided at the throat 4b to deflect the washing liquid flowing down the walls of the section 4a into the gas stream where it is atomized. Similarly, to prevent deposit of impurities of the walls of the diffusor section 4c, washing liquid is also supplied downstream of the flange 5 to form a film of water which flows downwardly on the walls of the diffusor section. The washing liquid is supplied to the upper section 4a by means of distributing channels 6a and 6b and to the lower section 4c by means of distributing channels 6c and 6d. The channels communicate with the inlet channel by outlet means 7a, 7b, 7c, and 7d respectively. The respective distribution channels are continuously supplied with washing liquid by liquid recirculating means comprising a supply conduit 7 which receives recirculated water from the bottom of the separation chamber 1 through a pipe 15 and the conventional recirculation means 16 which may include a sedimentation basin, filter, and recirculating pump.

Figure 2:
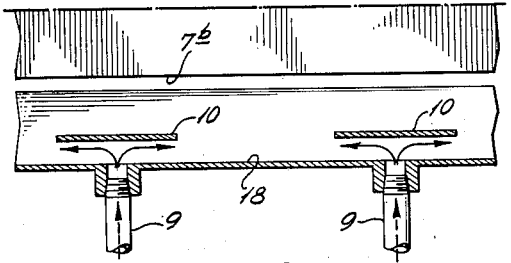
FIG. 2 is a sectional view taken on the line 2—2 of FIG. 1.
Figure 3:
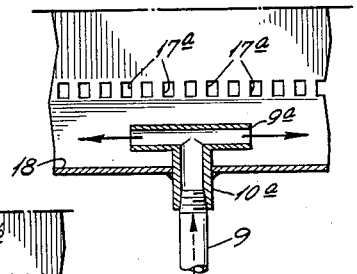
FIGS. 3 and 4 are views similar to FIG. 2 showing modifications within the scope of the present invention.
Figure 4:
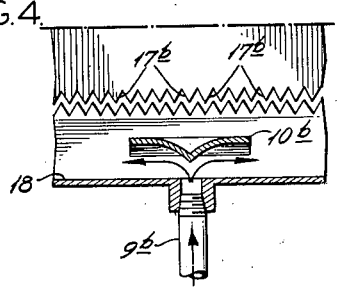

In accordance with the invention, the distribution channels 6a, 6b, 6c and 6d are V-shaped in cross section, having a pair of downwardly converging side walls terminating in a trough 18 of relatively narrow width. One of the distribution channel side walls defining liquid outlet means, hereinafter more fully described, for distributing liquid to the converging walls of the inlet channel so that the liquid flows down the converging walls of the inlet channel thereby preventing adherence to the walls of impurities entrained within the gas; while the other of the pair of downwardly converging side walls of the distribution channel is higher than the liquid outlet means. Further, means is provided to receive the recirculated water from the conduit 7 and inject the water into the channel at spaced locations along its length in such a direction to cause the incoming washing liquid to flow along the trough at the bottom of the chanel at a relatively high speed to thereby eliminate any deposit which might result from sedimentation in the channels. To this end, as shown in FIG. 2, the liquid is supplied at spaced locations by means of inlet nozzles 9, each having a baffle plate 10 positioned immediately above the same to direct the liquid longitudinally of the channel in the trough at a relatively high speed. In the alternative, as shown in FIG. 3, the nozzles 9 and baffles 10 may be replaced by the fittings 9a having the cross pipe 10a disposed longitudinally of the trough 18. A still further alternative is shown in FIG. 4 wherein the straight baffle 10 is replaced by a contoured baffle 10b to direct the washing liquid injected by its associated nozzle 9b longitudinally in the trough 18 of the channel.

While particular embodiments of the present invention have been herein illustrated and described, modifications may be made thereto without departure from the invention. For example, the distribution channel outlet means, in the present instance slots 7a, 7b, 7c, and 7d may be formed by spaced parallel edges as shown in FIG. 2, or may be formed by a series of slots 17a as shown in FIG. 3 or saw tooth edges as shown at 17b in FIG. 4. The invention simply requires a channel having downwardly converging walls merging into a restricted trough in which the liquid is injected longitudinally at a relatively high rate of flow, as defined in the appended claims.

What I claim is:

1. A gas purification apparatus comprising a venturi shaped inlet channel, a gas inlet at one end of said channel, a gas outlet at the other end of said channel, said inlet channel having converging side walls at said gas inlet end, a constricted throat defined by the terminus of said converging side walls, a washing liquid distribution channel on the upper portion of said converging side walls, said distribution channel having a pair of downwardly converging side walls terminating in a trough of reduced width, liquid inlet means connected to said distribution channel comprising a plurality of upwardly directed nozzles positioned at spaced intervals along said channel in said trough, and baffle means cooperating with said nozzles to direct the washing liquid longitudinally of the channel in the bottom of said trough at a relatively high speed to prevent sedimentation of impurities carried by the liquid, one of said distribution channel side walls defining liquid outlet means for distributing liquid to the converging walls of the inlet chmannel so that the liquid flows down the converging walls of said inlet channel thereby preventing adherence to the walls of impurities entrained within the gas, the other of said pair of downwardly converging side walls on said distribution channel being higher than said liquid outlet means, said washing liquid flowing down said converging side walls of said inlet channel being atomized into impurity laden gas at said constricted throat thereby agglomerating the impurities in said gas, a separation chamber underlying said venturi shaped inlet channel adapted to separate the atomized liquid and agglomerated impurities from the said gas thereby cleaning said gas, and liquid recirculating means connected to the separation chamber and adapted to supply the separated liquid to said liquid inlet means connected to said distribution channel.

2. A gas purification apparatus according to claim 1, wherein said nozzles and said cooperating baffle means are in the form of a plurality of T fittings having the cross pipe thereof disposed longitudinally of the channel in said trough.

References Cited in the file of this patent

UNITED STATES PATENTS

| | | |
|---|---|---|
| 1,751,999 | Hines | Mar. 25, 1930 |
| 1,800,356 | Powell | Apr. 14, 1931 |
| 2,522,600 | Brookins | Sept. 19, 1950 |
| 2,546,259 | Fenn | Mar. 27, 1951 |
| 2,661,195 | Van Bemmel et al. | Dec. 1, 1953 |
| 3,009,687 | Hendriks | Nov. 21, 1961 |

FOREIGN PATENTS

| | | |
|---|---|---|
| 11,246 | Great Britain | Sept. 6, 1890 |
| 1,027,636 | Germany | Apr. 10, 1958 |